June 24, 1930.  J. L. CREVELING  1,766,490
ELECTRIC SYSTEM
Original Filed Dec. 7, 1925
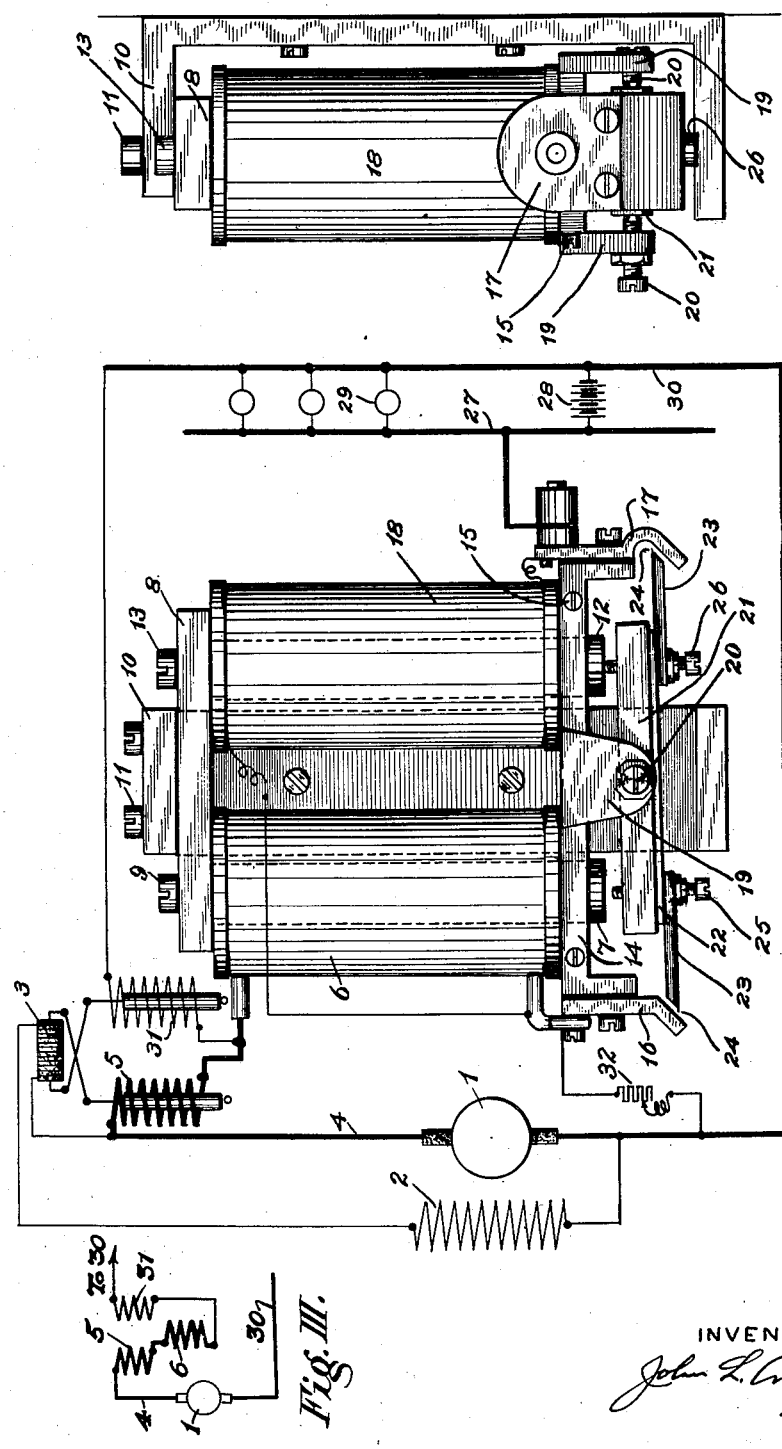
INVENTOR:
John L. Creveling Patented June 24, 1930

1,766,490

UNITED STATES PATENT OFFICE

JOHN L. CREVELING, OF NEAR TUCSON, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

ELECTRIC SYSTEM

Application filed December 7, 1925, Serial No. 73,536. Renewed March 4, 1930.

My invention relates to that class of electric systems wherein a dynamo or generator is used to charge a storage battery and operate lamps or other translating devices which are supplied by the battery when the dynamo is inoperative. As such systems are particularly applicable for the lighting of railway cars where the dynamo is driven at variable speed and subjected to stopping and starting, my invention will be described with particular reference to such a carlighting system.

It is an object of my invention, in such a system, to cause the generator and storage battery to be automatically connected when their voltages are substantially equal; and it is a further object of my invention to so connect the generator and battery when their voltages are so nearly equal that they may be considered, in practice, as equal, and to cause this connection to be broken when the generator voltage falls so slightly below that of the battery that the back discharge through the generator is substantially negligible. A further object of my invention is to bring about such connection and disconnection of the generator and battery throughout wide variation in the battery voltage, as the voltage across the battery such systems often varies considerably depending upon the condition of the storage battery and upon its condition of charge at the particular moment of such connection. In practical operating systems, it is not unusual for the voltage across the battery to vary between 28 and 40 volts, or thereabouts; and, in the system of my present invention, I cause the connection and disconnection of the generator to take place at what may be considered, for all practical purposes, substantially equal voltage, even throughout a much wider range than this. It is a further cbject of my invention to use a very slight current drawn from the battery and of so low value as not to form any appreciable drain thereupon, for the purpose of causing the generator to "build up" properly when started, and to utilize this current for the purpose of functioning in the operation of connecting and disconnecting the generator and battery.

In the drawing, Fig. I is a diagrammatic representation of a system embodying the elements of my invention, the principal parts of which are shown in relatively large scale in front elevation; and Fig. II is a side elevation of those parts illustrated in front elevation in Fig. I.

Fig. III is a diagram showing one modification that may be made in the arrangement of Fig. I.

In the drawing, referring particularly to Fig. I, 1 represents a dynamo or generator provided with a field coil 2 in series with which there is placed a carbon pile 3, and it will therefore be obvious that the generator may be regulated by properly manipulating the pile 3. The positive brush of the generator is connected as by wire 4 with one end of the solenoid 5, the opposite end of which is connected with the coarse winding or coil 6, the opposite end of which is connected with a contact member 16. The winding 6 surrounds the core 7, of iron or other magnetic material, carried by the yoke 8 and secured thereto as by screw 9. 10 is a permanent magnet having upper and lower extending poles, as shown plainly in Fig. II. The upper extension may be used to support the yoke 8 and the parts carried thereby and may be attached to the said yoke as by means of screws 11. The yoke 8 carries a core, of iron or other magnetic material, 12, attached thereto as by means of screw 13, similar to the core 7, which cores are preferably equally spaced with respect to the center line of the magnet 10. A member 14, of brass or other non-magnetic material, is drilled with holes adapted to slip snugly over the polar extensions of the cores 7 and 12, and is saw-slotted in a vertical plane extending toward the left from the opening surrounding the core 7, and toward the right from the opening surrounding the core 12, in such manner that by tightening screws 15, tending to close the said saw-slots, the cores 7 and 12 may be pinched in such manner that the member 14 will be securely attached thereto and support the windings 6 and 18. One end of the member 14 carries the contact member 16 electrically connected with the winding 6 and insulated from the member 14, as indicated. The opposite end of the member 14 carries a contact member 17, insulated therefrom as indicated. The core 12 is surrounded by a relatively very fine winding, indicated at 18, the opposite ends of which are electrically connected with the contact members 16 and 17, one end of the winding 18 being shown directly connected with 17, while the opposite end is connected with one end of the coil 6,—which is the equivalent of connection directly with 16. The member 14 is provided with downwardly extending lugs 19, carrying the adjustable screws 20, forming a pivotal support for the armature or keeper 21, of iron or other magnetic material, which is drilled to receive the ends of said screws 20. The keeper 21 carries a conducting member 22 which may be insulated therefrom, if desired, said conducting member having secured in electrical connection therewith, at its opposite ends, the flexible brushes 23, so arranged that when the keeper 21 is slightly rotated about its pivot 20 in a clockwise direction the brushes 23 will cause electrical connection between the contact members 16 and 17. If desired, an auxiliary contact member may be provided to insure contact between the brushes and the members 16 and 17, under exceedingly slight pressure. And, for this purpose, there is indicated a flexible leaf 24, in each brush 23, which extends slightly beyond the other leaves of the said brushes,—it being obvious that a very thin leaf thus extending may cause electrical connection between 16 and 17 to be established with very slight pressure, owing to the flexibility of said leaves; and it will also be obvious that any such auxiliary contacts may be omitted provided the main brushes 23 are properly arranged so that they simultaneously strike the contacts 16 and 17. The keeper 21 is provided with adjustable screws 25 and 26, which are made of brass or other non-magnetic material and which may limit the approach of the ends of the keeper 21 toward the magnet-poles 7 and 12. The keeper 21 and the parts carried thereby are all preferably balanced with respect to the pivots 20, which are preferably so arranged as to cause very little friction to resist rotation. Thus armature 21, being of reasonably small mass, may be swung from the position indicated in Fig. I to that causing electrical connection between the contacts 16 and 17, and vice versa, with the expenditure of very little energy. The contact member 17 is connected, as indicated, with the wire 27, carried to the positive side of the storage battery 28 and the positive side of the lamps or other translating devices indicated at 29, return from the lamps and battery being made to the generator as by wire 30. 31 is a voltage coil connected across the generator and adapted when energized to tend to raise the core, with which it is shown provided, and thus decrease the pressure upon the pile 3 and increase its resistance. The coil 5 is provided with a core, as shown, which it tends to raise when energized so as to lessen the pressure upon the pile 3 and increase its resistance. The coil 5 and its cooperating parts so manipulate the resistance 3 that a given maximum generator current cannot be exceeded throughout speed changes of the generator; while the coil 31 and its cooperating parts so manipulate the pile 3 that a given maximum voltage cannot be exceeded by the generator throughout speed changes.

As regulators for this service are now well-known in the art, one of this type is merely indicated here diagrammatically, for the sake of simplicity in illustration, it being understood that any of the well-known regulators having the characteristics required may be used for the purpose.

32 is a resistance which may be placed across the generator through coil 6.

An operation of my invention is substantially as follows:

If the generator be at rest or operating at sufficiently low speed, the contacts 16—23 and 17—23 will both be open and the battery 28 may supply the lamps or translating devices 29 in a well-known manner. Some current will flow from the positive side of the battery through wire 27 to one end of the winding 18, thence through said winding to one end of the coil 6, thence through the said coil and coil 5 and wire 4 to the generator; from which it will return to the battery through the wire 30. And I so arrange the winding 18 and the polarity of the permanent magnet 10 that this current flowing back through the generator, as above mentioned, tends to hold the keeper 21 in the position shown in the drawing by causing the right-hand side of the said keeper to be strongly attracted by the core 12, the airgap between said core and the keeper being adjustable as by screw 26. The small current flowing back through the magnet 18 thus locks the contacts 16—23 and 17—23 open, as an extremely small current will, with the proper adjustments of the parts, exert a very strong pull upon the right-hand end of the keeper. This small current flowing back through the coil 18, employed, as above mentioned, to lock the contacts open, provides a very small flow through the generator which serves to cause the same to "build up" properly when it is started in operation, and is an inappreciable drain upon the battery and need not be any greater than that ordinarily used in carlighting systems for the purpose of causing the generator to "build up" merely, said current usually being due to a high resistance shunt across the switch controlling the connection of the generator and storage battery,—a now well-known common practice in such systems. If now the generator be started, it will "build up" in a well-known manner, and when its voltage approaches that of the battery the current in the coil 18 will decrease and, when the voltage of the generator and battery are equal, there will be no current flowing in the said coil 18. As soon as the generator voltage exceeds that of the battery, the current in the coil 18 will be reversed and then tend to cause the keeper 21 to rotate in a clockwise direction and close the contacts 16—23 and 17—23, and thus connect the generator with the battery and translating devices. Or, if the auxiliary contacts indicated at 24 be used, they will come into contact with 16 and 17 before the brushes 23, proper, establish such connection. If now the generator voltage be caused to appreciably exceed that of the battery, current will flow from the generator through wire 4, coil 5, coil 6, contact 16—23, conducting member 22, contact 23—17, wire 27, to the battery and translating devices, and return to the generator through wire 30. And I so arrange the coil 6 that this current will now attract the left-hand end of the keeper 21 and cause a good contact to be established between the brushes 23 and the contact members 16 and 17; and it will be obvious that the pressure upon these contacts may be made to increase as the current through the coil 6 to the battery and translating devices increases. If now the generator voltage be increased and the generator tend to supply a current greater than desired, coil 5 will cause the resistance 3 to be so manipulated as to prevent this desired maximum current from being exceeded. If, on the other hand, the voltage limited by the coil 31 be reached before sufficient current is reached in the coil 5 to affect the resistance 3, the coil 31 will assume the regulating of the generator and prevent this predetermined voltage from being exceeded. Thus the translating devices may now be maintained by the generator and the battery may be charged in conjunction therewith, if the system be properly arranged for this purpose. If now the generator be slowed down until its voltage is nearly equal to that of the battery, a very small current will flow through the coil 6; and, if the generator voltage be allowed to fall slightly below that of the battery, the battery will discharge back through the coil 6, and thus, by reversing its effect upon the magnetic flux through the core 7, cause the keeper 21 to be revolved in a counter-clockwise direction into the position shown in the drawing, and the connection between the generator and battery broken at the contacts 16—23 and 17—23. The voltage of the generator now being slightly below that of the battery, a very feeble current will flow back through the coil 18 and hold the switch in this position in which it is shown in the drawing. If now the generator voltage be again increased, the above outlined cycle may be repeated.

In practice, I find that such a small current is required in the coil 18 to rotate the keeper 21 in a clockwise direction and close the contacts 16—23 or 16—24 and 17—23 or 17—24, that the generator and battery may be connected automatically at so near the same voltage as to be, for most practical purposes, the equivalent of the same voltage; while I also find that the back discharge through the coil 6, necessary to cause the contacts 16—23 and 17—23 to be opened, is so small that it may be called a negligible or practically zero back discharge, it, of course, being noted that the members 7, 8, 12 and 21 are preferably of material having a low reluctance and exhibiting as little hysteresis as possible so that the fluxes may be readily affected by very small changes in magnetomotive force. In practice, I find that by employing a small load upon the generator through the coil 6, while the generator is still disconnected from the battery, I may cause the connection between the generator and battery to be so adjusted as to take place as nearly upon equal voltages as may be desired; for, it will be noted that while the generator is at rest and disconnected from the battery there will be no current flowing through the resistance 32, while as soon as the generator electromotive force "builds up" some current will flow from the positive brush through wire 4, coil 5, coil 6 and resistance 32 to the negative brush of the generator. This current through coil 6 is in the same direction as that supplied by the generator to the lamps and battery and, therefore, tends to cause the keeper 21 to rotate clockwise and close the connection between the generator and the battery. By properly adjusting the value of the resistance 32, I can so adjust this current in the coil 6 that, when the voltage of the battery and generator are substantially equal, this current in the coil 6 will be sufficient, or nearly sufficient, as may be adjusted, to cause the keeper 21 to close the contacts 16—23 and 17—23 when the current in the coil 18 becomes zero, which it does when the battery and generator voltages are exactly equal. And, in this way, the operation of my system can be so adjusted that the generator and battery may be connected together at as nearly equal voltages as one may choose to adjust the system to operate. In practice, I often find it advisable to use a very small load in the coil 6, in this manner, which need not be more than enough to overcome the hysteresis effect in order to cause the generator and battery to be connected at what may be considered equal voltages, for all practical purposes, even where considerable refinement is desired. The current thus employed through the coil 6 may be so small that its effect upon the back discharge through the generator necessary to cause the generator to be disconnected from the battery may be neglected as the current through 32 need not be more than a small fraction of an ampere, in a 30 volt system, to accomplish its purpose.

It will, of course, be obvious that any other type of load may be used to replace the mere ohmic resistance 32, as for example, a pilot lamp of proper resistance, and such a lamp may be made to perform any useful function, such as indicating when the generator is operating. Or, if desired, any type of an indicating instrument of proper resistance may be employed at 32 which may serve to indicate the operation of the generator. It will further be obvious that if any other coil or generator current-using or voltage-measuring device in the system may be arranged so as to have the proper resistance, it may be used in place of the resistance shown at 32. That is, if the coil 31, for example, be of proper resistance and its end, (now shown connected to the upper end of the winding 6) be connected with the lower end of said winding instead, as shown in Fig. III, it may be used to perform the function of the resistance 32. Further, it will be plain that the current thus flowing through the winding 6 may be so adjusted, by properly adjusting the load indicated at 32, that the keeper 21 may be caused to rotate in a clockwise direction and close the contacts 16—23 and 17—23 at a little below zero voltage across coil 18, if desired, or to cause the keeper to be revolved and close the contacts at zero voltage across 18, if the keeper 21 and parts carried thereby be so arranged as to be out of balance and biased by the force of gravity so as to tend to assume the position shown in the drawing and open the contacts 16—23 and 17—23 on account of the action of gravity, or its equivalent, whenever both coils 6 and 18 are de-energized. With this latter arrangement, the contacts can always be caused to open when the generator is below a predetermined voltage, even though a battery lead be broken in such manner as to render the coil 18 unable to perform its usual function in connection with the battery.

It will also be obvious that the switch, as indicated in Fig. I as open, will close when the generator starts up, even if a battery lead be broken, provided there is any load upon the circuit, such as lamps 29, since current will flow from the generator through the winding 18 and the load to the wire 30 and thence back to the generator; and this current traversing the coil 18 will be in the direction tending to close the switch, which will operate to so act on account of the permanent field set up by the magnet 10. It will also be obvious that if the armature 21 be balanced, as is usual with this construction, the residual magnetism set up by the load current, which will traverse the magnet 6, will have a tendency to hold the switch closed under such conditions, since there will be no back discharge from the battery to reverse the residual effect when the generator slows down and stops. In either event, the lamps if thrown on will be supplied by the generator while running.

At first glance it would appear that if, with a broken battery lead, the switch should tend to remain closed, due to the slight residual magnetism, trouble would be encountered if the batteries were reconnected during a stop. This, however, is not the case, since it is always the custom, in connecting a storage battery into a circuit which might have a load upon it, to tap the connectors quickly together to see if a spark, indicating a load, ensues. This instantaneous making and breaking of the circuit, which is a common habit with all battery men, serves to kick the switch open and reverse the residual magnetism so that it remains open, and the connection can be made without any trouble ensuing.

Therefore, in my system, the generator is connected with the battery when their voltages are practically equal, and disconnected when their voltages are also practically equal, regardless of what the voltage of the battery may be within predetermined very wide limits; and the action of opening and closing the contacts, even though brought about by extremely small differences in voltage between the generator and battery, is, nevertheless, positive and not of an unstable or "chattering" nature.

While I have described the ends of the coil 18 as connected, in effect, directly across the contact members 16 and 17, so that current flowing back to the generator through coil 18 also flows through the coil 6 which contains only relatively few turns of heavy wire, the left-hand end of the coil 18 may readily be connected to the other end of the coil 6 so that the current going back from the battery to the generator through coil 18 does not circulate through the coil 6, if desired,—a connection which may be found preferable, if desired that the effect of the coil 6 under current carried by the coil 18 be eliminated.

I do not wish in any way to limit myself to any of the details of construction or modes of operation herein given to illustrate an embodiment of my invention, for it will be obvious that wide departure in the way of details, both in construction and operation may be made without departing from the spirit and scope of my invention which is as set forth in the following claims:

1. The combination with a generator, a storage battery charged thereby and means for connecting said generator and battery, of means operated to cause such connection by a coil in shunt around said connection and a coil in series with said connection having a material effect in causing said connection.

2. The combination with a generator, a storage battery charged thereby and means for connecting said generator and battery, of means for causing said connection operated by a coil across said connection and means for causing disconnection usefully cooperating therewith in the causing of said connection.

3. The combination with a generator and a storage battery charged thereby, of means for connecting and disconnecting the generator and battery comprehending contact mechanism and a voltage coil in shunt around the contact thereof for operating said mechanism to cause connection of the generator and battery in cooperation with an independently excited coil in series with said contact and materially affecting the closing thereof.

4. The combination with a generator and a storage battery charged thereby, of means for connecting and disconnecting the generator and battery comprehending contact mechanism and a voltage coil in shunt around the contact thereof and a coil in series with said contact functionally cooperating therewith in operating said mechanism to close said contact.

5. The combination with a generator and a storage battery charged thereby, of means for connecting and disconnecting the generator and battery comprehending contact mechanism and a voltage coil in shunt around the contact thereof for operating said mechanism to close said contact, and means cooperating therewith affected by the operation of the generator for opening said contact and functionally participating in the closing of the same.

6. The combination with a generator and a storage battery charged thereby, of means for controlling the connection therebetween comprising contact mechanism, a rotatable magnetic member for controlling the same and a magnet for affecting the operation of said member in shunt across the contact of said mechanism and a magnet in series with said contact for closing the same.

7. The combination with a generator and a storage battery charged thereby, of means for controlling the connection therebetween comprising contact mechanism, a movable magnetic member for controlling the same, a winding for affecting said member in shunt across the contact of said mechanism and a winding in series with said contact effecting the closing thereof.

8. The combination with a generator and a storage battery charged thereby, of means for controlling the connection therebetween comprising contact mechanism, a movable magnetic member for controlling the same, a winding for closing said contact in shunt around said contact and a winding for opening said contact in series therewith controlling the closing thereof.

9. The combination with a generator and a storage battery charged thereby, of means for controlling the connection therebetween comprising contact mechanism, a movable magnetic member for controlling the same, a winding for closing said contact in shunt around said contact, a winding for opening said contact in series therewith, and means whereby said last-named winding affects the point of closing of said contact.

10. The combination with a generator and a storage battery to be charged thereby and means for connecting and disconnecting the generator and battery including a contact, of a movable magnetizable means for controlling said contact, a winding for affecting the movement thereof and in shunt around said contact and a winding in series with said contact functionally affecting the closing thereof.

11. The combination with a generator, a storage battery charged thereby and means for connecting and disconnecting the generator and battery, of a winding for affecting the said means normally ineffective while the battery and generator are connected and effective during disconnection thereof, and a winding in series with the generator and battery when connected and functionally operative in the connection of the battery and generator under the influence of current flowing therethrough which is unaffected by the connection and disconnection of the battery and generator.

12. The combination with a generator, a storage battery and means for connecting and disconnecting the generator and battery including a contact, of means for controlling said contact including a winding in shunt around the contact and a winding in series with the contact functionally affecting the closing thereof under the influence of a material current from the generator and independent of the battery.

13. The combination with a generator, a storage battery and means for connecting and disconnecting the generator and battery including a contact, of means for controlling said contact including a winding in shunt around the contact and a winding in series with the contact functionally affecting the closing thereof under the influence of a material current from the generator, which current further affects the operation of the generator.

14. The combination with a generator, a storage battery to be charged thereby and means for connecting the generator and battery comprising a contact, of means for making and breaking said contact comprising a rotatable magnetic member having magnet cores on each side of its center of rotation and separated from said member by an air gap, means tending to cause a magnetic flux through said magnetic member and both said cores, a winding upon one of said cores connected around said contact, and a winding upon the other core in series with the contact.

15. The combination with a generator, a storage battery to be charged thereby and means for connecting the generator and battery comprising a contact, of means for making and breaking said contact comprising a rotatable magnetic member, windings situated upon each side of the center of rotation of said magnetic member, and means tending to cause a magnetic flux through said member and linking said windings, one of said windings being connected around said contact and the other in series therewith.

16. The combination with a generator and a storage battery to be charged thereby, of means for causing connection and disconnection of the generator and battery including a rotatable member for operating said means having electro-magnets situated upon opposite sides of its center of rotation, means tending to cause a magnetic flux through said rotatable member from its center of rotation toward said magnets and linked with the windings thereof, one of said electro-magnets having a winding permanently connecting the generator and battery and the other having a winding carrying useful current supplied by the generator to the battery.

17. The combination with a generator, a storage battery to be charged thereby and means for connecting the generator and battery comprising a contact, of means for making and breaking said contact comprising a movable magnetic member having magnet cores on each side of its center and separated from said member by an air gap, means tending to cause a magnetic flux through said magnetic member and both said cores, a winding upon one of said cores connected around said contact, and a winding upon the other core in series with the contact.

18. The combination with a generator, a storage battery to be charged thereby and means for connecting the generator and battery comprising a contact, of means for making and breaking said contact comprising a rotatable magnetic member, windings situated upon each side of the center of rotation of said magnetic member, and means tending to cause a magnetic flux through said member and linking said windings, one of said windings being connected around said contact and the other in series therewith, said windings cooperating with said flux to rotate said member.

19. The combination with a generator, a storage battery to be charged thereby and a load circuit supplied by the generator and battery, of means for causing connection and disconnection of the generator and battery including a rotatable member for operating said means having electro-magnets situated upon opposite sides of its center of rotation, means tending to cause a magnetic flux through said rotatable member from its center of rotation toward said magnets and linked with the windings thereof, one of said electro-magnets having a winding permanently connecting the generator and battery and the other having a winding normally carrying useful current supplied by the generator to the battery, one of said windings cooperating with said flux to close said contact when the generator is running and the battery is inoperative and there is a load upon the load circuit.

JOHN L. CREVELING.